United States Patent [19]
Khalafalla et al.
[11] 4,208,294
[45] Jun. 17, 1980

[54] DILUTION STABLE WATER BASED MAGNETIC FLUIDS

[75] Inventors: Sanaa E. Khalafalla, Minneapolis; George W. Reimers; Stephen A. Rholl, both of Burnsville, all of Minn.

[73] Assignee: The United States of America, as represented by the Secretary of the Interior, Washington, D.C.

[21] Appl. No.: 11,292

[22] Filed: Feb. 12, 1979

[51] Int. Cl.[2] .................... C09D 11/00; F16D 37/02; H01F 1/28
[52] U.S. Cl. .................... 252/62.52
[58] Field of Search .................... 252/62.52

[56] References Cited

U.S. PATENT DOCUMENTS 3,764,540 10/1973 Khalafalla et al. .............. 252/62.55
3,843,540 10/1974 Reimers et al. .............. 252/62.52

FOREIGN PATENT DOCUMENTS 51-44580 4/1976 Japan .............. 252/62.52

*Primary Examiner*—F. Edmundson
*Attorney, Agent, or Firm*—William S. Brown; Donald A. Gardiner

[57] ABSTRACT

A dilution stable water based magnetic fluid is provided by dispersing magnetic particles in water with the aid of a $C_{10}$-$C_{15}$ aliphatic monocarboxylic acid. The magnetic particles are preferably particles of magnetite, prepared by precipitation of dissolved iron chloride salts from aqueous solution by the use of ammonium hydroxide. The preferred acids used in preparing the dispersions are dodecanoic ($C_{12}$) and tridecanoic ($C_{13}$).

13 Claims, No Drawings

DILUTION STABLE WATER BASED MAGNETIC FLUIDS

BACKGROUND OF THE INVENTION

The present invention relates to magnetic fluids. Magnetic fluids are defined as Newtonian liquids that retain their fluidity in the presence of an external magnetic field. These fluids comprise stable colloidal suspensions of magnetic particles in such liquid carriers as hydrocarbons (kerosine, heptane, etc.), silicones, water, and fluorocarbons.

While the term "ferrofluid" was used to designate a magnetic colloid in which the dispersed phase is a magnetic ferrous material, the more general term "magnetic fluid" is preferred because these fluids may contain ferromagnetic particles other than iron—i.e. cobalt, nickel, gadolinium, and dysprosium. They may also contain ferrimagnetic substances other than magnetite ($Fe_3O_4$) or maghemite ($\gamma$-$Fe_2O_3$). Examples are the magnetic ferrites of manganese, cobalt, nickel, copper, and magnesium. Further discussion of magnetic fluids, their properties and their uses may be found in an article by S. E. Khalafalla published in *Chemical Technology*, Volume 5, September 1975, pp. 540-546 and in the bibliography therein.

In preparing magnetite for use in magnetic fluids, one usually starts with an aqueous solution of ferric and ferrous salts from which the magnetite particles are precipitated. Accordingly, the preparation of a water-based magnetic fluid appears desirable. Several methods have been proposed for the preparation of such water-based systems. In one system, dodecylamine is used as a dispersing agent. While this material can be used to prepare a water-based magnetic fluid, the fluid is not dilution stable. When diluted, flocculation occurs. Although these dilution sensitive fluids are suitable for some applications, they are unsuitable for other applications, such as mineral beneficiation, in which dilution occurs. Another water-based system, utilizing petroleum sulfonate dispersing agent, is described in U.S. Pat. No. 4,019,994. That fluid, however, is also not dilution stable.

It is an object of the present invention to provide a dilution stable water-based magnetic fluid and a further object is to provide a method of making same.

BRIEF SUMMARY OF THE INVENTION

The foregoing and other objects which will be apparent to those having ordinary skill in the art are achieved in accordance with the present invention by providing a dilution stable, water-based magnetic fluid containing water, magnetic particles dispersed therein, and at least one aliphatic monocarboxylic acid having from 10 to 15 carbon atoms, and by providing a method of preparing such magnetic fluid by dispersing magnetic particles in water containing at least one of the mentioned acids. The invention will be more fully understood in light of the following description of preferred embodiments.

DESCRIPTION OF PREFERRED EMBODIMENTS

The magnetic particles useful in the invention are known, per se, and include iron oxides, nickel-bearing materials, ferrites, and the like. Magnetite—$Fe_3O_4$— is the preferred magnetic material. The particles are of colloidal size, generally less than about 300 Å, and preferably about 80 to 100 Å. Magnetite is preferably made by precipitation from a solution of ferric and ferrous chloride in which the mole ratio of ferrous chloride: ferric chloride is about 1:2. However, in practice, the ferrous chloride oxidizes during the preparation and it is therefore preferred to use ferrous chloride in an excess of the 1:2, ratio, generally at least 1.2:1 and preferably about 1.4:1 to 1.6:1.

The acids which are useful in the invention are straight chain aliphatic monocarboxylic acids having from 10 to 15 carbon atoms. Lauric ($C_{12}$) and ficocerylic ($C_{13}$) give the most dilution stable magnetic fluids and are therefore preferred. Pelargonic acid ($C_9$), aliphatic acids having eight or less carbon atoms, palmitic acid ($C_{16}$), and aliphatic acids having 17 or more carbon atoms, do not form stable magnetic fluids.

The magnetic particles are dispersed in water with the acid dispersing agent to form magnetic fluids in accordance with the invention. The amount of magnetic particles, as measured by saturation magnetization, can vary widely, for example, from about 80 to 900 gauss, usually 100 to 400 gauss. Dispersal of the magnetic particles may be facilitated by heating. For example, in the case of magnetite particles and dodecanoic acid, heating at a temperature of about 150° to 200° F. for about one and one half minutes is suitable. The acid is used in an amount sufficient to coat the magnetic particles to provide the dilution-stable dispersion. While the amount will, of course, vary somewhat with particular acids and magnetic particles, in general, an amount of at least about 25% by weight, based on the weight of the magnetic particles, is suitable. Amounts in excess of 80% are usually not required. In most cases, good results are obtained at about 50% by weight, and a preferred range is, therefore, about 30 to 70% by weight.

As mentioned above, magnetite particles are preferably provided by precipitation from aqueous solution. Precipitation is preferably effected with ammonium hydroxide. Other bases, such as sodium hydroxide, may be used, but the viscosity is increased due to formation of soaps. Because of the generally low solubility of the acid dispersing agents in water, the precipitating agent, such as ammonium hydroxide, is used in excess of the theoretical amount needed to precipitate all of the iron salts in aqueous solution. In general, the amount used is sufficient to form a salt with the acid dispersing agent subsequently employed. For example, ammonium hydroxide in an amount of at least about 73% in excess of the theoretical precipitating amount is optimal in the use of dodecanoic acid and magnetite particles.

After precipitation, the magnetic precipitate is washed with aqueous ammonium hydroxide. It is preferred to wash the precipitate sufficiently to substantially remove chloride since a high chloride ion content will yield a poor quality magnetic fluid.

The invention is further illustrated in the examples which follow.

EXAMPLE 1 (Comparison Example)

A water-base magnetic fluid stabilized with dodecylamine is prepared using the following method. Iron salts $FeCl_2.2H_2O$ (12 g) and $FeCl_2.6H_2O$ (24 g) are each dissolved in 50 ml of water. The solutions are combined into a 600 ml beaker and 50 ml of ammonium hydroxide (0.9 sp.gr.) is added while mixing. The beaker containing the resulting precipitate is then placed onto a permanent magnet to accelerate settling. After resting on the magnet for 5 minutes, the clear salt solution is decanted. The precipitate is then washed by mixing with a solution containing 5 ml ammonium hydroxide in 95 ml of water. This mixture is also placed on a permanent magnet for 5 minutes before decanting the clear solution. Dodecylamine (4 g) is then added to the precipitate and the mixture heated for 4 minutes while stirring. A 750 watt laboratory hot plate adjusted to full output is used for heating the mixture which is then made to a volume of 50 ml with water. The resulting magnetic fluid has a saturation magnetization of 200 gauss.

Diluting this fluid with 25 times its volume of water causes flocculation. Prior to this flocculation point, the magnetic fluid saturation magnetization decreases as a linear function of dilution. Although this gradual flocculation is reduced by the presence of the dispersing agent in the diluting water, efforts to redisperse the flocculated magnetite are unsuccessful.

EXAMPLE 2

Preparation of a dilution-stable magnetic fluid according to the present invention follows the method described in Example 1, except that dodecanoic acid is substituted for dodecylamine. Ferrous chloride $FeCl_2.4H_2O$ (12 g) and ferric chloride (24 g) are each dissolved in 50 ml of water and then combined in a 600 ml beaker. Concentrated ammonium hydroxide (50 ml) is then added while mixing to the iron salt solution to form a precipitate. The beaker is then placed on a permanent magnet for 5 minutes and the clear salt solution decanted. The precipitate is then washed using a solution of ammonium hydroxide (5 ml) and water (95 ml). This mixture is placed on the magnet for 5 minutes and the clear solution decanted. Dodecanoic acid (4.8 g) is then added to the precipitate. This is placed on a 750 watt laboratory hot plate, adjusted to maximum output, for 1.5 minutes and then made up to 50 ml final volume. This procedure yields an aqueous base magnetic fluid having a saturation magnetization of 200 gauss. This magnetic fluid can be diluted with water at 50:1 ratio without flocculation.

EXAMPLE 3

The procedure of Example 2 is followed except that the acid is replaced with the acids listed in the table which follows with the results indicated in the table.

EFFECT OF FATTY ACID CHAIN LENGTH ON STABILIZING WATER-BASE MAGNETIC FLUIDS

| Chain length, $C_n$ | Acid Name: I.U.C. System | Acid Name: Common | Formula | Results |
|---|---|---|---|---|
| $C_9$ | Nonanoic | Pelargonic | $CH_3(CH_2)_7COOH$ | magnetic fluid not formed |
| $C_{10}$ | Decanoic | Capric | $CH_3(CH_2)_8COOH$ | dilution stable |
| $C_{11}$ | Undecanoic | Hendecanoic | $CH_3(CH_2)_9COOH$ | more dilution stable |
| $C_{12}$ | Dodecanoic | Lauric | $CH_3(CH_2)_{10}COOH$ | most dilution stable |
| $C_{13}$ | Tridecanoic | Ficocerylic | $CH_3(CH_2)_{11}COOH$ | most dilution stable |
| $C_{14}$ | Tetradecanoic | Myristic | $CH_3(CH_2)_{12}COOH$ | more dilution stable |
| $C_{15}$ | Pentadecanoic | Isocytic | $CH_3(CH_2)_{13}COOH$ | dilution stable |
| $C_{16}$ | Hexadecanoic | Palmitic | $CH_3(CH_2)_{14}COOH$ | magnetic fluid not formed |

EXAMPLE 4

In this Example, a series of runs of 50 ml final volume is made as in Example 2 and the time of heating on the hot plate is varied as indicated in the table below. The saturation magnetization for each run is also reported.

| Run No. | Heating Time, minutes | Saturation Magnetization (gauss) |
|---|---|---|
| A | 0.5 | 120 |
| B | 1.0 | 175 |
| C | 1.5 | 200 |
| D | 2.0 | 190 |
| E | 2.5 | 170 |

It is apparent from the data that heating promotes dissolution of the dodecanoic acid. With little heating, the liquid is sludge-like, has a relatively high viscosity, and relatively low magnetization. Prolonged heating produces foam which, again, has an adverse affect on magnetization. Best results are obtained when heating is sufficient to promote maximum solubility of the acid dispersing agent without causing excessive foaming.

After very long heating times, the foaming subsides, and gum-like solids begin to form and drop out of the suspension. These solids can be redispersed by adding a 5 percent ammonia solution and heating to form an "instant" water-base magnetic fluid. This ease of preparation of an instant magnetic fluid is one of the major advantages of using the present acid dispersing agents.

EXAMPLE 5

As mentioned above, a dispersing agent such as dodecanoic acid is only slightly soluble in water. Accordingly, the precipitation agent is used in an amount in excess of theoretical to form a soluble salt with the dispersing agent. This is illustrated in the present example which follows the procedure of Example 2 using dodecanoic acid and a fixed heating time of 1.5 minutes.

| Run | Amount of Ammonium Hydroxide (ml) | Saturation Magnetization (gauss) |
|---|---|---|
| A | 35 | 15 |
| B | 40 | 110 |
| C | 45 | 190 |
| D | 50 | 200 |
| E | 55 | 190 |
| F | 60 | 185 |

The stoichiometric quantity required is 26 ml and the data shows that magnetization rises steeply as the amount of precipitation agent approaches about 70% in excess of stoichiometric and does not change dramatically thereafter.

EXAMPLE 6

A series of runs is made following Example 2 using dodecanoic acid, 1.5 minutes heating, and 50 ml of ammonium hydroxide as precipitating agent. The precipitate is washed with various volumes of water containing 5% by volume of concentrated ammonium hydroxide. Washing is important to remove chloride ion, introduced in the system by dissolving the iron chloride salts, since the pressure of chloride ion yields poor quality magnetic fluids. The data show that, in this example, the interference of chloride ion is substantially eliminated by employing a wash volume of about 75 ml.

| Run | Wash Liquid (ml) | Saturation Magnetization (gauss) |
|---|---|---|
| A | 50 | 165 |
| B | 75 | 190 |
| C | 100 | 200 |
| D | 125 | 195 |
| E | 150 | 200 |

Unlike the case with dodecylamine-dispersed magnetic fluids, the presence of chloride ion is not essential to prepare good magnetic fluid dispersions using the present acids.

EXAMPLE 7

A series of tests is conducted to determine the optimum quantity of dodecanoic acid required to disperse 11.5 grams of magnetite to yield 50 ml of water-base magnetic fluid. Dodecanoic acid is varied from 3.5 to 5.5 grams while the heating time, the volume of ammonia, and the wash volume are fixed at their optimum values for maximum saturation magnetization as determined in Examples 4, 5, and 6. Results are as follows:

| Run | Amount of Acid (grams) | Saturation Magnetization (gauss) |
|---|---|---|
| A | 3.5 | 25 |
| B | 4.0 | 150 |
| C | 4.5 | 180 |
| D | 4.75 | 190 |
| E | 5.0 | 185 |
| F | 5.5 | 190 |

It will be readily apparent that the minimum amount of other acids can be determined in this manner and that other optimal parameters for other acid dispersing agents can be readily determined as indicated in Examples 4, 5, and 6.

What is claimed is:

1. A dilution stable, water-based magnetic fluid consisting essentially of water, magnetic particles dispersed therein, and at least one saturated aliphatic monocarboxylic acid having from 10 to 15 carbon atoms.

2. A dilution stable aqueous magnetic fluid according to claim 1 wherein said magnetic particles are present in an amount such that the fluid has a saturation magnetization of from 80 to 900 gauss.

3. A dilution stable aqueous magnetic fluid according to claim 1 wherein said monocarboxylic acid is present in an amount of at least about 25% by weight based on the weight of the magnetic particles.

4. A dilution stable aqueous magnetic fluid according to claim 1 wherein said acid is selected from the group consisting of dodecanoic acid and tridecanoic acid.

5. A method of preparing a dilution stable water-based magnetic fluid consisting essentially of dispersing magnetic particles in water containing at least one saturated aliphatic monocarboxylic acid having from 10 to 15 carbon atoms.

6. A method according to claim 5 wherein dispersion of the magnetic particles is facilitated by heating the water.

7. A method according to claim 5 wherein the magnetic particles comprise magnetite.

8. A method according to claim 7 wherein the magnetite particles are provided by admixing ammonium hydroxide and an aqueous solution containing ferric chloride and ferrous chloride to form a magnetite precipitate and separating the resulting precipitate from the aqueous solution.

9. A method according to claim 8 wherein the ammonium hydroxide is used in an amount of at least 70% in excess of theoretical required to precipitate all of the ferric and ferrous chloride in said aqueous solution.

10. A method according to claim 8 wherein the precipitate is washed with aqueous ammonium hydroxide.

11. A method according to claim 5 wherein the amount of monocarboxylic acid is at least 25% by weight based on the weight of the magnetic particles.

12. A method according to claim 6 in which prolonged heating is employed to effect precipitation of gum-like solids.

13. A method according to claim 12 in which the gum-like solids are redispersed by addition of aqueous ammonia to form a dilution-stable, water-base magnetic fluid.

* * * * *